June 27, 1961  E. H. COMLY  2,989,800
ROTARY CUTTERS
Filed Aug. 8, 1957  3 Sheets-Sheet 1
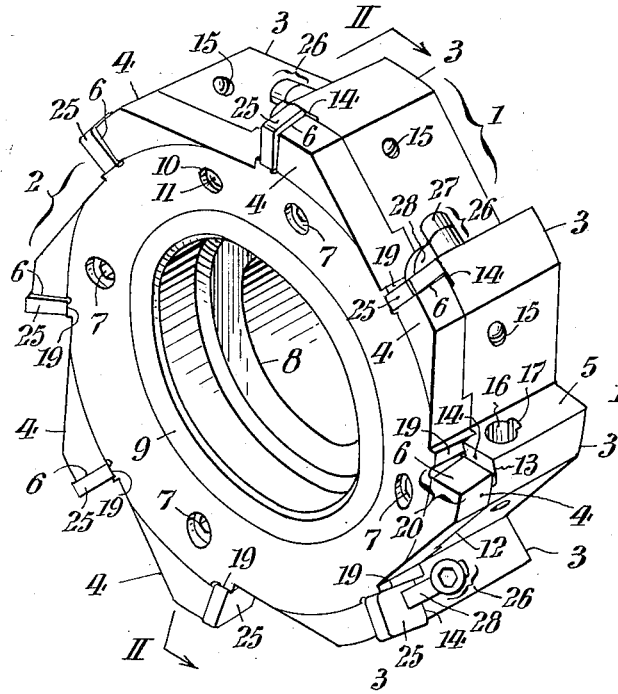
FIG_1_
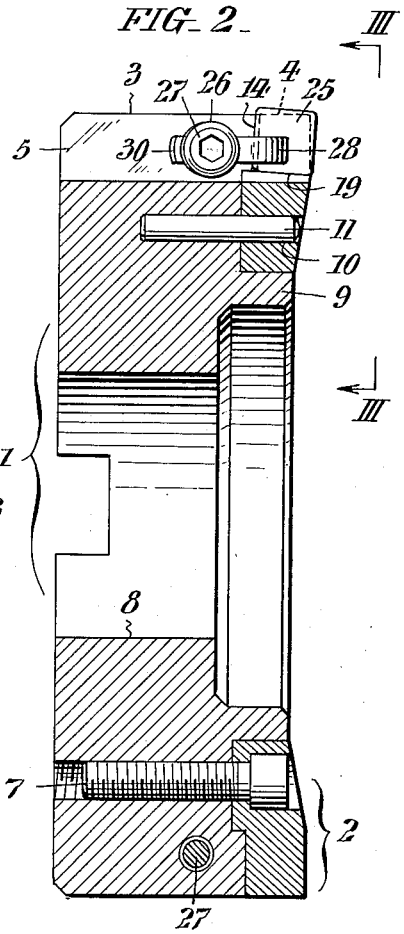
FIG_2_
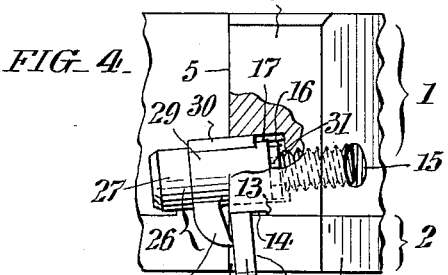
FIG_4_
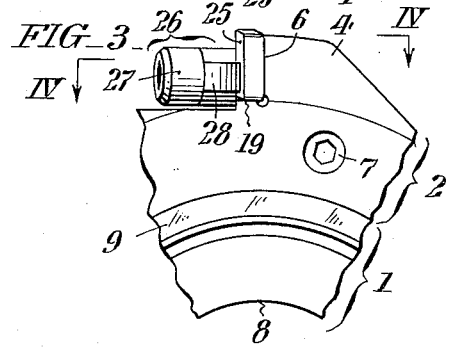
FIG_3_
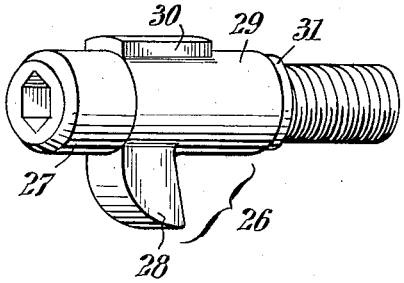
FIG_9_
INVENTOR:
Elwood Howard Comly,
BY Paul & Paul
ATTORNEYS.

June 27, 1961 E. H. COMLY 2,989,800
ROTARY CUTTERS
Filed Aug. 8, 1957 3 Sheets-Sheet 2
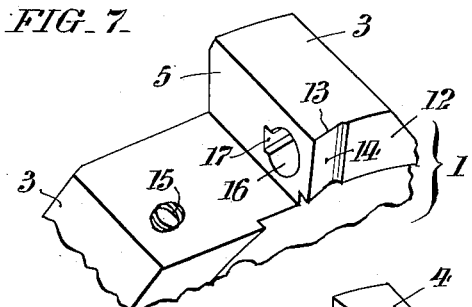
FIG_7_
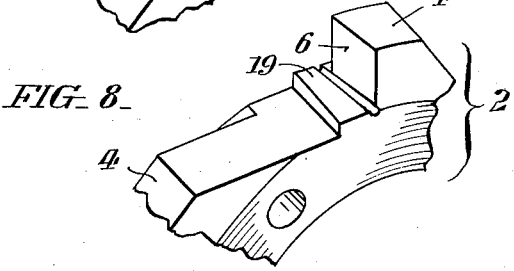
FIG_8_
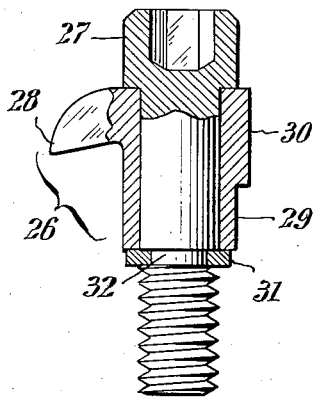
FIG_10_
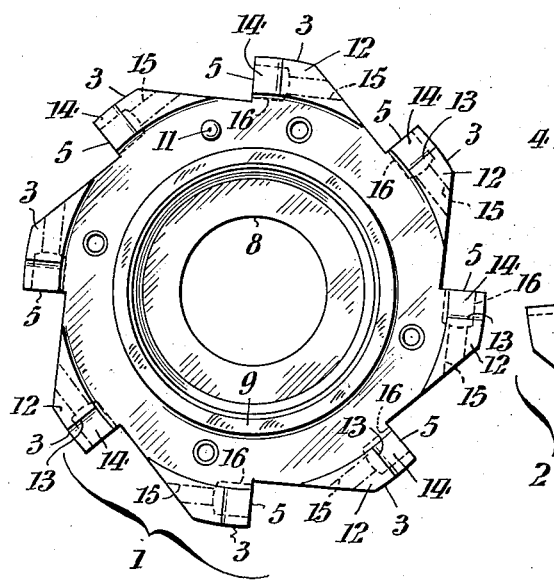
FIG_5_
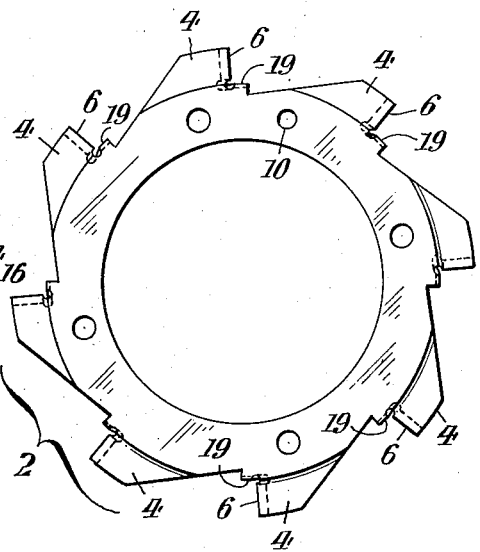
FIG_6_
INVENTOR:
Elwood Howard Comly,
BY Paul & Paul
ATTORNEYS.

June 27, 1961

E. H. COMLY 2,989,800

ROTARY CUTTERS

Filed Aug. 8, 1957

INVENTOR:
Elwood Howard Comly,
BY Paul & Paul
ATTORNEYS.

United States Patent Office 2,989,800
Patented June 27, 1961

2,989,800
ROTARY CUTTERS
Elwood Howard Comly, 722 Pitt Road, Rowland Park, Cheltenham, Pa.
Filed Aug. 8, 1957, Ser. No. 677,131
2 Claims. (Cl. 29—105)

This invention relates to rotary cutters. More particularly, it is concerned with multi-blade rotary cutters intended for use in milling machines or the like.

The chief aim of my invention is to provide a cutter of the kind referred to which is simple in construction, which lends itself to production in quantity more economically than rotary cutters as heretofore ordinarily made; and in which the blade support is composed of at least two toothed components, one a main or body component and the other a complemental component, said components jointly affording recesses for lodgement of the individual cutter blades with said blades backed only by the teeth of the complemental component, and said complemental component being easily and quickly removable from the main component and replaceable in the event of damage thereto by a new one, or after having been re-machined as may be necessary at relatively small cost.

Other objects and attendant advantages will appear from the following detailed description of the attached drawings, wherein:

FIG. 1 is a perspective view of a rotary cutter conveniently embodying my invention in one form.

FIG. 2 shows the cutter in axial section taken as indicated by the angled arrows II—II in FIG. 1.

FIG. 3 is a fragmentary view in elevation looking as indicated by the angled arrows III—III in FIG. 2.

FIG. 4 is a fragmentary view looking as indicated by the arrows IV—IV in FIG. 3.

FIG. 5 shows the main component of the cutter in front elevation.

FIG. 6 shows the complemental component of the cutter in rear elevation.

FIGS. 7 and 8 are fragmentary views in prospective respectively showing the configuration of the teeth of the main and complemental components of the cutter.

FIG. 9 is a prospective view of a clamping device by which the individual cutting blades are held in position.

FIG. 10 shows the clamping device of FIG. 9 in axial section.

Figure 11:
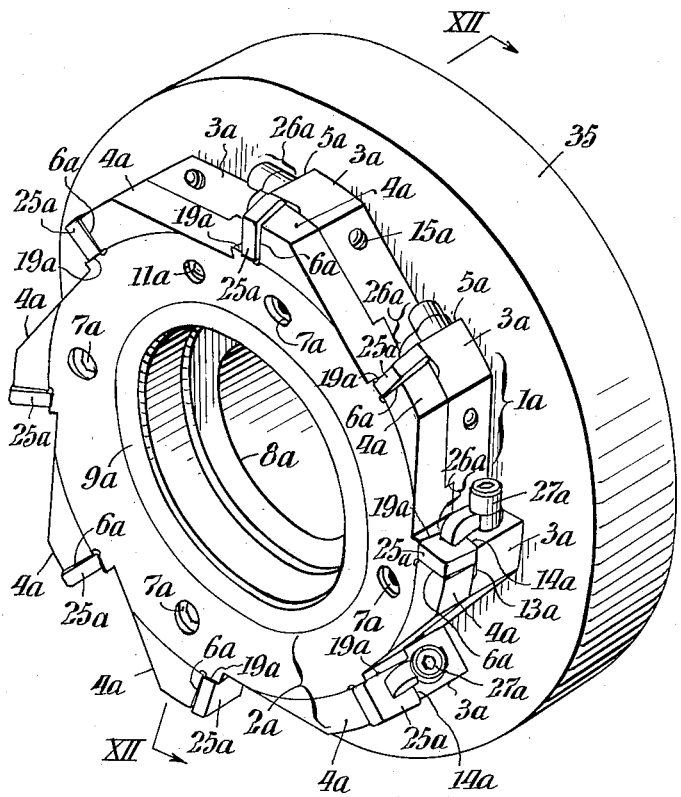
FIG. 11 is a prospective view similar to FIG. 1 showing a modified embodiment of my invention.

With specific reference first more particularly to FIGS. 1–8 of these illustrations, the rotary cutter of my invention, in the form there exemplified, comprises a relatively thick annular wheel-like body component 1, and a thinner annular supplement mating component 2, said components respectively having equally-spaced peripheral teeth 3 and 4 of which the front faces 5 and 6, respectively, are substantially radial, and of which the backs are rearwardly and inwardly sloped in a manner similar to the teeth of ratchet wheels. The supplemental component 2 is secured to the body component 1 in coaxial relation by a plurality of circumferentially-arranged screws 7 with the front of the teeth of the component 2 off-set rearwardly (as considered with respect to rotation of the cutter in use) relative to the teeth of the component 1. As shown in FIG. 2, the component 1 has an axial bore 8 for fitment over a shaft (not illustrated) upon which the cutter is to be mounted, and is formed with a forwardly-projecting concentric flange 9 about which the component 2 is engaged. As further shown, the component 2 has an aperture for registry with an eccentrically disposed dowel pin 11 which is anchored in and projects forwardly from the component 1. As a consequence of the provision just described, the component 2 will, upon removal and subsequent replacement, be always reassembled with component 1 in the original relationship. As instances in FIGS. 5 and 7, the side face, 12, of each tooth 3 of the body component 1 is cut away as at 13 through a short distance rearwardly to provide a surface 14 which is pitched at a slight angle to the plane of said component as well as a slight angle to the axis of said component with consequent formation of a shouldered recess. Extending longitudinally through each tooth 3 of the component 1 in parallel relation to the surface 14, see FIG. 4, is a threaded bore 15 with a plain counter bore 16 of larger diameter open at the front end of the tooth 3, and extending laterally from the counter bore opposite to the recess is a parallel-sided keyway 17. From FIGS. 4 and 8 it will be observed that the front face 6 of each tooth 4 of the supplemental component 2 is sloped rearwardly at an angle to the axis of said component, or at right angles to the face 14 of the cut 13 in the side of the corresponding tooth 3 of the body component 1. Moreover, immediately forward of the front face 6 of each tooth 4 of the component 2, a rise or ledge 19 is formed on the back of the immediately preceding tooth, the top surface of said ledge being sloped rearwardly and forwardly at an angle to the axis of said component, i.e., at right angles to the surface 14 of the cut 13 in the corresponding tooth 3 of the component 1. When the components 1 and 2 are assembled as in FIGS. 1 and 2, there are thus formed, jointly by them, three sided recesses such as at 20 in FIG. 7 for snug lodgment of replaceable hardened cutter blades 25. To secure each cutter blade 25 within the recess provided for it jointly by the components 1 and 2, I have shown a clamp finger 26, see FIGS. 9 and 10, which is secured by a headed screw 27 to the front face of a tooth 3 of the component with the tip 28 of the finger bearing upon the exposed side of the blade 25. From FIG. 4 it will be observed that the cylindrical sleeve 29 portion of the finger 26 fits within the plan enlarged portion 16 of the threaded bore in the tooth 3 of the component 1 and has a rib 30 diametrically opposite its finger projection slidably engaged in the keyway 17. The plain portion of the screw 27 is passed through the sleeve 29 portion of the clamp element 26 with the diametrically reduced distal end thereof engaging the threaded portion of the bore 15 in the tooth 3. By means of a ring 31 set into a circumferential groove 32 between the plain and threaded portions of the screw 27, the latter is held permanently assembled with the clamp element 26. Due to the engagement of the rib 30 on the sleeve portion of the clamp element 26 in the keyway 17 in the plain portion 16 of the bore in the tooth 3 of the component 1, said element is held against rotation as the screw is tightened to clamp the cutting blade 25, or as said screw is backed off slightly to release said blade.

It is to be particularly noted from FIGS. 1–4 that when each cutting blade is in place, the back thereof bears fully against the front face 6 of the tooth 4 of the supplemental component 2 only, while the bottom edge thereof bears fully upon the ledge surface 19, and the inner edge thereof bears fully against the surface 14 of the recession 13 in the corresponding tooth 3 of the component 1. Accordingly, the driving force for the blades 25 during the use of the cutter is transmitted solely by the supplemental component 2. The blades can, of course be turned about, after one edge becomes worn, for presentation of a new cutting edge and be eventually replaced after all of the edges have been used. In the event of damage to one or more of its teeth, the supplemental component 2 can be removed and the fronts of the teeth be re-machined, or, if the damage is too extensive, an entirely new one can be substituted therefore at relatively small cost instead of having to discard the cutter as a whole as was necessary heretofore with prior art cutters of this type.

Figure 12:
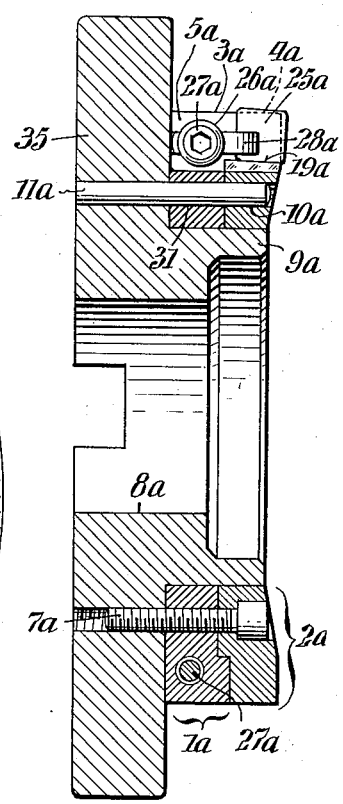
FIG. 12 is an axial section taken as indicated by the angled arrows XII—XII in FIG. 11.

In the modified embodiment of my invention shown in FIGS. 11 and 12, the component 1a is thinner than the component 1 of the first described embodiment, and is axially bored to fit, with the component 2a, over a forwardly extending concentric flange 9a on a master adapter 35 which is bored to fit upon a driving shaft. In this instance, the components 1a and 2a are both secured, with capacity for ready removal, to the adapter 35 by the radially arranged screws indicated at 7a and are maintained mutually in accurate axial registry against relative displacement, by a dowel pin 11a which is anchored in the adapter for the passage of which pin the component 1a is provided with a hole 31. As shown, the adapter 35 is quite large as to diameter and is intended to function as a fly wheel and thereby steady the cutter in its rotation. The components 1a and 2a here are otherwise of the same construction as the components 1a and 2 of the first disclosed embodiment. Consequently, in order to dispense with the necessity for repetitive description, all the elements of the modified embodiment having their counterparts in the first form of my invention are identified with the same reference numerals previously employed with the addition, in each instance, however, of the letter *a* for convenience of more ready distinction. The modified construction is advantageous in that it makes possible the mounting and interchange of cutters of different sizes and shapes upon the adapter without requiring the removal of the adapter from the shaft.

Having thus described my invention, I claim:

1. In a rotary cutting tool, a body component having peripheral teeth similar to those of a ratchet wheel, the side face of each tooth being inclined rearwardly from the front face at a slight angle to the general plane of said component, and each tooth having a longitudinal bore therethrough with a threaded portion and a plain counterbore with a keyway open at the front face of the tooth; a correspondingly configured supplemental component affixed in co-axial relation to the body component with the exposed side faces of its teeth rearwardly offset relative to the teeth of the body component, the frontal face of each tooth of the supplemental component being pitched at right angles to the inclined side face of the corresponding tooth of the body component, and the back of the preceding tooth of the supplemental component having a surface likewise pitched at right angles to said side face of the tooth of the body component; a flat replaceable cutting blade polygonal in outline and having parallel pairs of side edges, backed against the front face of each tooth of the supplemental component with one edge thereof bearing against the side face of the corresponding tooth of the body component, and the other edge thereof bearing against the inclined surface at the back of the preceding tooth of the supplemental component; and securing means for holding the individual blades in place, each such securing means including a finger adapted to bear upon the exposed face of the blade and having a hub with a key projection for slidingly engaging into the plain portion and keyway of the bore in the tooth of the body component, and a headed screw with its shank passed through the hub of the finger and threadedly engaged into the tapped portion of the bore in the tooth of the body component.

2. The invention according to claim 1, wherein the screw associated with each clamp element has a circumferential groove in its shank with a stop ring set thereinto to cooperate with the screw head in keeping the screw permanently assembled with the clamp finger.

References Cited in the file of this patent

UNITED STATES PATENTS

| | | |
|---|---|---|
| 1,341,565 | Krepps | May 25, 1920 |
| 2,407,502 | Kraus | Sept. 10, 1946 |
| 2,521,035 | Boyle | Sept. 5, 1950 |
| 2,712,686 | Heldt | July 12, 1955 |
| 2,787,823 | Kennicott | Apr. 9, 1957 |
| 2,805,467 | Greenleaf | Sept. 10, 1957 |
| 2,805,469 | Greenleaf | Sept. 10, 1957 |